US008848700B2

(12) United States Patent
Ahn et al.

(10) Patent No.: US 8,848,700 B2
(45) Date of Patent: Sep. 30, 2014

(54) METHOD FOR DEVICE-TO-DEVICE COMMUNICATION BASED ON CELLULAR TELECOMMUNICATION SYSTEM

(71) Applicant: Electronics and Telecommunications Research Institute, Daejeon (KR)

(72) Inventors: Jae Young Ahn, Daejeon (KR); Choong Il Yeh, Daejeon (KR); Kyoung Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 83 days.

(21) Appl. No.: 13/630,700

(22) Filed: Sep. 28, 2012

(65) Prior Publication Data

US 2013/0083779 A1  Apr. 4, 2013

(30) Foreign Application Priority Data

Sep. 30, 2011  (KR) .................. 10-2011-0100056
Sep. 28, 2012  (KR) .................. 10-2012-0109143

(51) Int. Cl.
*H04W 72/04* (2009.01)
*H04W 76/02* (2009.01)

(52) U.S. Cl.
CPC ............ *H04W 72/04* (2013.01); *H04W 76/023* (2013.01); *H04W 72/0486* (2013.01)
USPC ......................................... 370/376; 370/252

(58) Field of Classification Search
None
See application file for complete search history.

(56) References Cited

U.S. PATENT DOCUMENTS

| 2006/0013160 | A1* | 1/2006 | Haartsen ...................... 370/328 |
| 2007/0171910 | A1 | 7/2007 | Kumar |
| 2010/0169498 | A1* | 7/2010 | Palanki et al. ............... 709/228 |
| 2011/0223953 | A1 | 9/2011 | Lee et al. |
| 2014/0056250 | A1* | 2/2014 | Cattoni et al. ............... 370/329 |

FOREIGN PATENT DOCUMENTS

| KR | 10-1017505 | 2/2011 |
| KR | 1020110102936 | 9/2011 |
| KR | 1020110103852 | 9/2011 |

* cited by examiner

*Primary Examiner* — John Blanton
(74) *Attorney, Agent, or Firm* — Nelson Mullins Riley & Scarborough LLP

(57) ABSTRACT

Disclosed is device-to-device communication based on a cellular communication network. A method of operating a terminal capable of supporting D2D (device to device) communication based on a cellular communication network may include: determining whether to perform central control D2D communication or distributed control D2D communication; and performing the distributed control D2D communication, or requesting a setting for the central control D2D communication to a base station on the basis of the determination. With the D2D communication based on the cellular communication network, the cellular communication, the central control D2D communication, or the distributed control D2D communication may flexibly and selectively operate in the cellular network.

10 Claims, 2 Drawing Sheets

METHOD FOR DEVICE-TO-DEVICE COMMUNICATION BASED ON CELLULAR TELECOMMUNICATION SYSTEM

CLAIM FOR PRIORITY

This application claims priority to Korean Patent Application No. 10-2011-0100056 filed on Sep. 30, 2011 and No. 10-2012-0109143 filed on Sep. 28, 2012 in the Korean Intellectual Property Office (KIPO), the entire contents of which are hereby incorporated by reference.

BACKGROUND

1. Technical Field

Example embodiments of the present invention relate in general to a method for device-to-device communication, and more specifically, to a method for implement device-to-device communication in a cellular communication network.

2. Related Art

Device-to-device communication (hereinafter, also referred to as D2D communication) is a communication method that performs direct data transmission and reception between two adjacent terminals, not via a base station. That is, two terminals become a source and a destination of data, respectively.

There are several discussions about use cases for efficiently utilizing this device-to-device communication. As an example, device-to-device communication may be applied to a local media server for providing a large amount of data (for example, programs of rock concerts, information about musicians, etc.) for audiences who attend rock concerts.

In this case, each device accesses a serving cell to perform phone calls and Internet access with an existing cellular link while the device may directly transmit and receive the large amount of data to and from a local media server that operates as in D2D communication with the device.

D2D link may be enabled not only between devices having the same serving cell, but also between devices having different serving cells. For example, a third device in a first base station may perform D2D communication with a sixth device in a second base station.

This device-to-device communication includes a centralized control D2D communication method and a distributed control D2D communication method.

In the centralized control D2D communication method, a device that intends to communicate with other devices may request a central node that performs control (for example, a base station in a cellular communication network) to establish a link, and the central node may allocate wireless resources for device-to-device communication between two devices to allow communication between the devices when the devices are adjacent to each other. In this case, the central node may mange almost all operations of the devices, and the wireless resources allocated for a cellular link in D2D communication or another D2D link may be reused.

In the distributed control D2D communication method, a device may establish a link in a distributed control way (that is, by direct signal exchange between devices), independently of one central control node, to directly exchange data with neighboring devices. This distributed control device-to-device communication includes FlashLinQ from Qualcomm as a standard. FlashLinQ is a synchronous TDD (Time Division Duplexing) technology.

The above D2D communication method may have several advantages and disadvantages, compared to an existing cellular communication system. Accordingly, a communication system where the above D2D communication method is combined with the cellular mobile communication system, is expected to be widely used. However, the distributed control D2D communication method is not considered in the current cellular communication network, and also the current cellular communication network does not provide a solution for performing both existing cellular communication and D2D communication.

SUMMARY

Accordingly, example embodiments of the present invention are provided to substantially obviate one or more problems due to limitations and disadvantages of the related art.

Example embodiments of the present invention provide a method of operating a base station to allow D2D communication based on cellular communication network, where the base station determines whether centralized control D2D communication is performed and whether cellular link communication is performed.

Example embodiments of the present invention also provide a method of operating a terminal to allow D2D communication based on cellular communication network, where the terminal determines whether distributed control D2D communication is performed, and whether centralized control D2D communication is performed.

Example embodiments of the present invention also provide a method of operating a terminal to allow D2D communication based on cellular communication network, where the terminal performs synchronization, discovery, paging, and traffic processes when the distributed control D2D communication is performed on the basis of wireless resources allocated by a base station.

Example embodiments of the present invention also provide a method of operating a base station to allow D2D communication based on cellular communication network, where the terminal monitors appropriateness of an amount of the allocated wireless resource when the distributed control D2D communication is performed on the basis of wireless resources allocated by a base station.

In some example embodiments, a method for D2D (device to device) communication based on cellular communication network includes: determining whether to perform central control D2D communication or cellular link communication on the basis of a request of at least one terminal, or depending on determination of the base station; and performing the central control D2D communication or the cellular link communication on the basis of the determination.

The base station may determine to perform the central control D2D communication when a target terminal and a source terminal capable of D2D communication are in the same or adjacent cells.

The base station may allocate the same wireless resources for the central control D2D communication through information exchange with a base station of the adjacent cell when the target terminal and the source terminal are located in different cells.

In other example embodiments, a method of operating a terminal capable of supporting a cellular communication network-based D2D communication includes: determining whether to perform central control D2D communication or distributed control D2D communication; and performing the distributed control D2D communication or requesting a setting for the central control D2D communication to a base station on the basis of the determination.

The terminal may determine whether to perform the central control D2D communication or the distributed control D2D communication on the basis of the amount of data to be transmitted or received to or from an adjacent terminal, or determine whether to perform the central control D2D communication or the distributed control D2D communication on the basis of congestion in the distributed control D2D communication.

In still other example embodiments, a method of operating a terminal capable of supporting a cellular communication network-based D2D communication includes: extracting a cellular frame timing and SFN (system frame number) information using a broadcast channel and synchronization signal from a base station; receiving setting information for distributed control D2D communication from the base station; acquiring a timing for the distributed control D2D communication on the basis of the cellular frame timing, the system frame number, and the setting information; and performing the distributed control D2D communication on the basis of the timing for the distributed control D2D communication.

The synchronization signal may be PSS (primary synchronization signal) or SSS (secondary synchronization signal), and the broadcast channel may be PBCH (Physical Broadcast Channel).

The setting information may be received through SI (system information) or RRC (radio resource control) signaling.

The setting information may include: at least one of (a) information for acquiring a start point of the distributed control D2D communication from the cellular frame timing and the system frame number; (b) information regarding time periods of discovery, paging, and traffic stages for the distributed control D2D communication; (c) information regarding a transmission method for the distributed control D2D communication; and (d) information regarding a hash function for generation of a connection ID.

In the performing of the distributed control D2D communication, the terminal may control, in paging and traffic stages, transmission power on the basis of the density of terminals participating in the distributed control D2D communication in a cell.

In the performing of the distributed control D2D communication, the terminal may select and use PDR (Peer Discovery Resource) grouped by probability of being returned by the base station, in ascending order of the probability. The setting information may include information regarding selection criteria and grouping information of PDR used in the discovery stage of the distributed control D2D communication.

The method may further include reporting to the base station information regarding performance capability of the distributed control D2D communication and activation of the performance capability.

The method may further include reporting to the base station success of data transmission through the distributed control D2D communication.

The method may further include reporting failure or latency generation to the base station when the terminal fails data transmission through the distributed control D2D communication, or latency is generated over a certain level.

In still other example embodiments, a method of operating a base station capable of supporting a cellular communication network-based D2D communication may include: receiving information regarding performance capability of distributed control D2D communication and activation of the performance capability from at least one terminal; and estimating the number of terminals participating in the distributed control D2D communication and the amount of needed resources.

The information regarding the activation of the performance capability of the distributed control D2D communication received from the terminal may include information regarding participation in the discovery stage and participation in the paging/traffic stage.

The method may further include receiving a success of data transmission from the terminal succeeding in data transmission through the distributed control D2D communication.

The method may further include receiving a failure or latency generation from at least one terminal when the terminal fails data transmission through the distributed control D2D communication, or latency is generated over a certain level.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
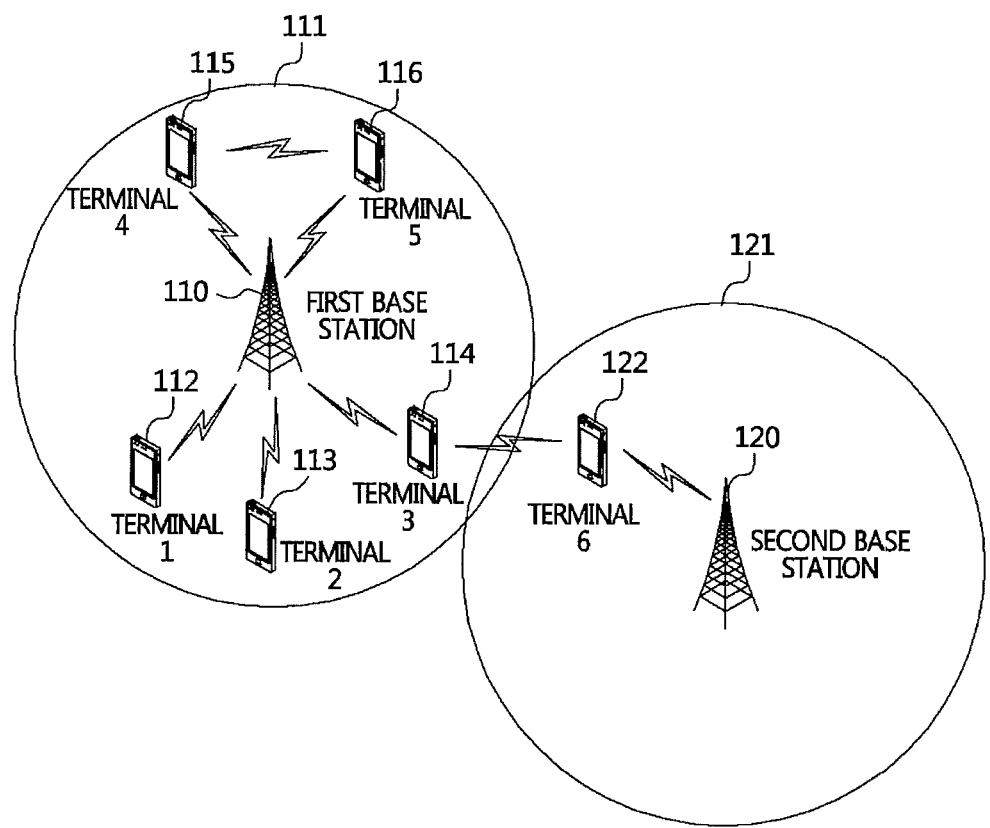
FIG. 1 is a concept view illustrating device-to-device communication based on cellular communication network.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

A terminal used in the specification may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the other terms. Various embodiments of the terminal may include a cellular phone, a smart phone having a wireless communication function, a personal digital assistant (PDA) having a wireless communication function, a wireless modem, a portable computer having a wireless communication function, a capturing device such as a digital camera having wireless communication function, a game device having a wireless communication function, a music storage and replay appliance having a wireless communication function, an Internet appliance enabling wireless Internet access and browsing, and terminals or a portable unit having combinations of the functions, but the present invention is not limited thereto.

A base station used in the specification is a part that is generally fixed or moved to communicate with terminals, and may be a term that indicates the collective name for a base station, a node-B, an eNode-B, a base transceiver system, an access point, a relay, a femto cell, etc.

Hereinafter, example embodiments of the present invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a concept view illustrating device-to-device communication based on cellular communication network.

Referring to FIG. 1, the cellular communication network includes a first base station 110 and a second base station 120.

In this case, first to third terminals 112, 113, and 114 in a cell 111 of the first base station 110 performs communication through a typical access link (cellular link) of the first base station while fourth and fifth terminals 115 and 116 in the cell 111 of the first base station directly perform data transmission and reception with each other, not via the base station.

Returning to FIG. 1, D2D link may be allowed not only between devices having the same serving cell, but also between devices having different serving cells. For example, the third terminal 114 in the cell 111 of the first base station 110 may perform D2D communication with a sixth terminal 122 in the cell 121 of the second base station 120.

The fourth terminal 115, the fifth terminal 116, the third terminal 114, and the sixth terminal 122 that perform device-to-device communication may exchange control signals for establishment of D2D communication link and allocation of resources available to D2D communication with the first base station 110 and the second base station 120, and thus to be controlled by the base station, which may be defined as D2D communication based on cellular communication network.

Figure 2:
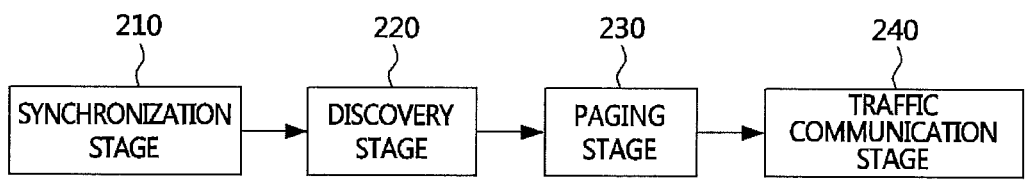
FIG. 2 is a concept view illustrating a procedure in distributed control D2D communication.

FIG. 2 is a concept view illustrating a procedure in distributed control D2D communication.

Referring to FIG. 2, the distributed control D2D communication procedure may include a synchronization stage 210, a discovery stage 220, a paging stage 230, and a traffic communication stage 240.

A representative example of the distributed control D2D communication method is FlashLinQ from Qualcomm, and FlashLinQ includes the above-described communication procedure. However, the below-described distributed control D2D communication procedure is not limited to FlashLinQ technology, and may be a general synchronous distributed control D2D communication procedure.

The synchronization stage is where each device participating in D2D communication acquires synchronization using an appropriate reference signal, and finds timing of time periods when discovery, paging, and traffic communication are performed.

Figure 3:
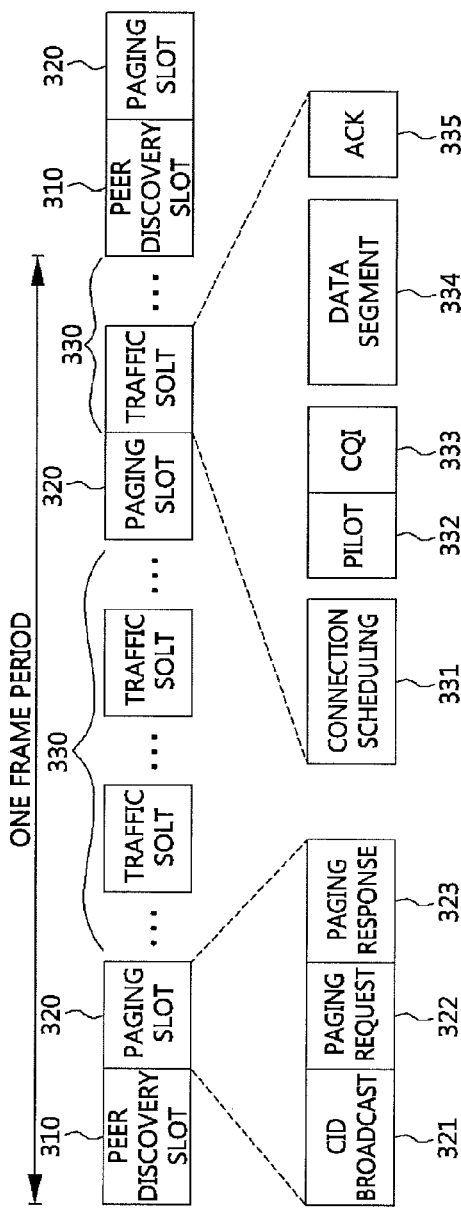
FIG. 3 is a timing chart illustrating a synchronous timing structure of the procedure of the distributed control D2D communication.

FIG. 3 is a timing chart illustrating a synchronous timing structure of the procedure of the distributed control D2D communication.

Referring to FIG. 3, a device having acquired synchronization performs operations related to the discovery in a peer discovery slot 310, operations related to the paging in a paging slot 320, and operations related to traffic data exchange in a traffic slot 330. This is an essential procedure of synchronous distributed control D2D communication, which minimizes power consumed, by devices participating in D2D, in the discovery and paging stages.

The discovery stage is to find a device capable of D2D communication. That is, the discovery stage is that each device transmits information ("expression", for example, which is generated using a device ID and an application ID) needed to notify other devices of its existence using PDR (peer discovery resource) unused by other devices, and receives information transmitted from other devices to determine which peers are around each device.

The paging stage is where a device requiring transmission and reception after the discovery establishes connection with an adjacent device, which is a stage of obtaining a separate ID for participating in a connection establishment process of a traffic stage, that is, a connection ID (CID). In this case, CID may be a temporal and local value.

Figure 4:
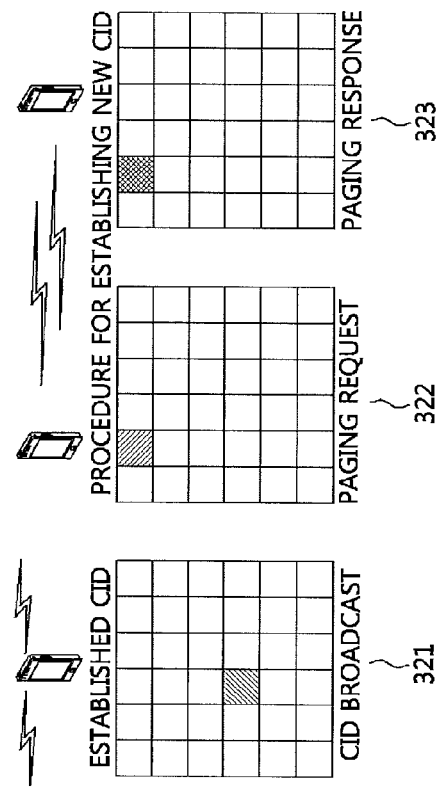
FIG. 4 is a concept view illustrating a paging stage in the procedure of the distributed control D2D communication.

FIG. 4 is a concept view illustrating a paging stage in the procedure of distributed control D2D communication.

Referring FIG. 4, the paging stage may be divided into a CID broadcast stage 321, a paging request stage 322, and a paging response stage 333. A device requesting paging (pager) and a device responding to the paging (pagee) obtain the same CID through the paging process.

The CID broadcast stage is that devices that obtain an existing CID and continue to participate in link scheduling in the following traffic stage broadcast a CID using a resource corresponding to the CID. The remaining devices, other than the device broadcasting the CID during this period, perform a reception operation.

In the paging request stage, each device (pager) which desires traffic communication generates a CID using its expression, an expression of a corresponding device (pagee), and the current time (using a hash function), and if the generated CID is the same as CIDs received during a CID broadcast period, the pager transmits a paging request signal using a wireless resource corresponding to the CID. All other devices, other than the device transmitting the paging request signal, perform during this period, an operation of checking whether each CID is received.

In the paging response stage, all devices other than a pager generate CIDs using their private expressions and the expressions of corresponding devices, and also generate a CID using a public expression. That is, the pagee generates the same CID using the same expression information as the pager, checks whether the CIDs received during the paging request period are the same as CIDs generated by itself, and if the CIDs are not the same as the CIDs received during a CID broadcast period, the corresponding device (page) transmits paging response using a resource corresponding to the CID.

This is to solve a problem where the CIDs received in the CID broadcast period by the pager and pagee may be different, and thus other pairs of devices generate the same CID to proceed to the traffic stage.

The traffic stage is a stage of transmitting and receiving data, where devices having obtained CID during the paging process all participate and perform distributed scheduling, and devices having obtained transmission and reception authority perform transmission and reception of data.

A period when the traffic stage is performed is divided into a link scheduling 331, a pilot period 332, a CQI period 333, a data period 334, and an ACK period 335.

The link scheduling (or connection scheduling) period is a period for scheduling the transmission and reception authority in a data period in a distributed method without a central node's limit, where devices most efficiently perform spatial reuse of radio resources without generating interference to each other. That is, devices having data to be transmitted participate in link scheduling repeatedly during the traffic period, and the link scheduling period is configured with RTS (Request to Send) and CTS (Clear to Send).

CIDs are mapped into a pair of wireless resources of RTS and CTS, respectively. The wireless resources of RTS and CTS have a priority in scheduling according to their position, selection of the pair of wireless resources is pseudo-randomized on the basis of CID, the pair of wireless resources is newly selected for fairness between CIDs for each traffic slot.

A device having data to be transmitted transmits a signal using a wireless resource corresponding to the CID obtained in RTS period. A device having received this signal transmits a CTS signal if a SIR (Signal to Interference Ratio) of the received signal is over a certain level, and gives ups transmission of a CTS signal if the SNR is below the certain level.

A device transmitting RTS gives up traffic data transmission and does not participate in from a pilot process to an ACK process if the device determines that the CTS signal is not received in a resource corresponding to the same CID (a reception level is below a certain level), or that interference over a certain level will be generated in links having higher priority.

A rate scheduling period may be formed by combining a pilot period and a CQI period. A transmission device obtaining wireless resources in a distributed method through a connection scheduling process transmits a pilot signal, and a reception device measures a channel using the pilot signal and generates appropriate CQI information to respond to the transmission device.

In the data and ACK period, the transmission device transmits data according to CQI information, and the reception device responds with ACK.

FlashLinQ from Qualcomm is only for distributed control D2D communication that operates independently, and does not consider combination with the existing cellular communication network. Accordingly, the present invention provides a method capable of D2D communication in a cellular communication network such as 3GPP LTE.

Method of Determining Whether D2D Communication is Performed in Cellular Communication Network In a typical cellular communication network, a device is considered to exchange data with only a base station. However, in addition to this function, the cellular communication network may be needed to support device-to-device communication.

In this case, the cellular communication network-based D2D communication may be classified into a central control type and a distributed control type.

First, the cellular communication network-based central control D2D communication may be cellular communication network-based D2D communication where link establishment and resource allocation are dynamically performed by a base station whenever the link establishment including scheduling is needed. The cellular communication network-based distributed control D2D communication may be cellular communication network-based D2D communication that fixedly or semi-fixedly designates and informs of a wireless resource separate from a wireless resource for a cellular link used in discovery, paging, and traffic communication. Devices that participate in the distributed control D2D communication minimize dynamic control of the base station with the wireless resource, establish a link in a distributed control method through direct signal exchange between the devices, and directly exchange data with adjacent devices using the link If the cellular communication network supports both the central control D2D communication and the distributed control D2D communication, the cellular communication, the central control D2D communication, or the distributed control D2D communication may selectively operate depending on circumstances.

In the cellular communication network, either the central control D2D communication or the distributed control D2D communication may be determined depending on decision by a network or device.

First, the network may determine and control one of the cellular communication and the central control D2D communication upon a cellular link establishment request of the device, and to perform the central control D2D communication according to the request by the device. The network may be configured not to determine whether the distributed control D2D communication is selected. As described above, when the network fixedly or semi-fixedly allocates resources used for the distributed control D2D, then the device determination is made whether the distributed control D2D operation is performed under decision by the device.

In this case, the network may establish the central control D2D communication link if the network confirms that a destination device is located in the same cell as or a cell neighbor to a cell of a source device, and may directly perform communication between the source device and the destination device. Otherwise, the network may establish the cellular link. In this case, for central control D2D communication between devices in neighbor cells, the same wireless resource is necessarily allocated through cooperation (information exchange) with an adjacent base station.

Also, the network may issue a command for the central control D2D communication according to its determination even when there is no link establishment requirement of the device.

Also, the device may participate in the distributed control D2D communication, or request the establishment of the central control D2D communication link to the network in consideration of the amount of data to be exchanged (to be expected to be exchanged) with neighbor devices.

In this case, the device may determine whether to participate in the distributed control D2D communication, or to request central control D2D communication link establishment to the base station. For this, all devices, other than a device having no function for the distributed control D2D communication or no intention to participate in the distributed control D2D communication, should participate in a process of discovery of the distributed control D2D communication continuously, or if necessary.

In a case where the device has data to be transmitted to an adjacent device, the device may participate in paging and traffic communication processes of the distributed control D2D communication when the amount of data to be exchanged (or to be expected to be exchanged) is small, and request allocation of the central control D2D link to the base station when the amount of data to be exchanged (or to be expected to be exchanged) is great, or the amount is small but congestion occurs in the distributed control D2D communication.

Cellular Communication Network-Based Distributed Control D2D Communication Method Hereinafter, considerations will be discussed in synchronization, discovery, paging, and traffic stages when the cellular communication network supports the distributed control D2D communication. Specifically, in the present invention, a solution for supporting the distributed control D2D communication in the 3GPP LTE cellular communication network has been discussed above. However, even in a similar cellular communication network, the technical idea discussed below may be implemented with technical elements identical or similar to those of the 3GPP LTE system.

1) Considerations in Synchronization Stage

As described above, all devices participating in the distributed control D2D communication are needed to be synchronized (synchronous distributed control D2D communication).

In this case, the devices are synchronized using a synchronization signal or broadcast signal provided by a base station in a cellular communication network.

For example, in 3GPP LTE, each device may obtain synchronization using PSS (Primary Synchronization Signal), SSS (Secondary Synchronization Signal), and PBCH (Physical Broadcast Channel) of the base station. For example, SFN (System Frame Number) may be represented by 10 bits, which is a combination of 8 bits carried by PBCH (MIB: Master Information Block) and 2 bits acquired through blind decoding of the synchronization signal (one cycle time is $2^{10}*10$ ms=10240 ms=10.24 sec). Synchronization timing (D2D communication superframe, sub-superframe, frame, slot timing, etc.) needed for the distributed control D2D communication is acquired using this cellular frame timing, SFN, and configuration information provided by a network (base station). Thus, all devices operate according to the acquired synchronization timing.

2) Considerations in Discovery, Paging, and Traffic Stages

Resource configuration for the distributed control D2D communication may be performed by one of two following methods, or a combination thereof.

A first method is FDM (Frequency Division Multiplexing), where one band in one subframe is designated for the distributed control D2D communication, and the other band is scheduled for cellular link.

A second method is TDM (Time Division Multiplexing), where a separate subframe is designated for the distributed control D2D communication.

Resource configuration for the distributed control D2D communication is desired to be equally applied to all cells, which is to allow for the distributed control D2D communication between devices located in neighbor cells.

To support the distributed control D2D communication in the cellular communication network, the network is needed to manage configuration for the distributed control D2D communication (that is, D2D timing configuration, wireless resource configuration, transmission method, optimization of all kinds of parameters related to the distributed control to D2D communication), and manage resources of the distributed control D2D communication (change in an amount of resources, monitoring appropriateness of an amount of resources). This is also needed to collect charging data for the distributed control D2D communication.

Management of Configuration Information Related to Distributed Control D2D Communication The configuration information related to the distributed control D2D communication may include all or a portion of the below discussion, if desired.

a) Timing structure for distributed control D2D communication. Since each device is aware of cellular frame timing and SFN, the device may obtain synchronization for D2D communication by receiving SFN of cellular communication network indicating a start (including a start of a frame, if necessary) and subframe offset of a sub-superframe for D2D communication, and a D2D communication sub-superframe (frame) number.

b) Frame structure (position, cycle time, etc. in discovery, paging, traffic communication, etc.) of distributed control D2D communication, and configuration and amount of wireless resources for each stage of D2D c) Transmission method and parameter of distributed control D2D communication (transmission methods depending on discovery, paging, traffic communication, etc., all kinds of parameters related to the distributed control D2D communication, for example, yielding parameter)

d) Information regarding hash function (for CID generation) (which may be delivered implicitly and explicitly according to configuration information regarding resources)

The above-described information may be broadcast as SI (System Information) in a cell-specific method, and delivered to a terminal through RRC (Radio Resource Control) signaling in a UE-specific method. Alternatively, the signaling is also allowed by the combination of both the methods.

Also, the above-described configuration information for the distributed control D2D communication of other operator networks should be delivered to a device through SI broadcast, RRC signaling, or a combination thereof, such that each device may participate even in the distribution control D2D communication of other communication operator network.

Next, it will be desirable that the same amount of wireless resources for the distributed control D2D communication is designated, and the same configuration is applied for each cell if densities of D2D devices in cells are similar. However, if densities of D2D devices in cells are different, it will be desirable that a different amount of wireless resources is allocated for each cell. In this case, there are difficulties such as interference between the cellular link and the distributed control D2D communication resource. Accordingly, a method of designating the same wireless resources and partially adjusting the configuration with SI and/or RRC signaling for each cell, may be used.

First, in the discovery stage, all devices participate in the discovery process when in normal state. However, as the density of devices increases, the configuration is adjusted to decrease the number of transmitting devices. In this case, only devices needed to perform transmission, such as a device intending to provide or receive a service, or a device intending to respond to its corresponding device are commanded to participate in the discovery transmission. In this case, the device starting transmission by a request of its corresponding device performs transmission only during certain time periods and then stops the transmission. Unlike this, all devices participating in D2D communication continue to perform reception.

Second, in the paging stage, transmission parameters (for example, transmission power control) for each cell are allowed to be changed depending on the density of devices. That is, reducing transmission power decreases transmission range and increases spatial reuse.

Third, also in the traffic stage, transmission parameters (for example, transmission power control) for each cell are allowed to be changed depending on the density of devices. That is, reducing transmission power decreases transmission range and increases spatial reuse.

Management of an Amount of Resources for D2D Communication

When the amount of wireless resources for the distributed control D2D communication is changed, there is a need for a solution to a problem in the transition process.

First, PDR resources may be divided and managed for a case where some wireless resources allocated in the discovery stage should be reduced. That is, the discovery resource is divided into 2 or more groups, a device needing PDRID is allowed to select the PDRID from among a resource group having low or no possibility of being returned by a base station. The device can select one of PDRIDs in other groups only when the number of selectable PDRIDs in the group is below a certain number. Also, a resource group having high possibility of being returned by a base station may have a low selection probability, and a resource group having low possibility of being returned by a base station may have a high selection probability. The above-described configuration information may include information about grouping of resources and essential parameters (for example, selection reference of PDR resource group, selection probability in each group, etc.).

In a case where the amount of discovery resources increases, the above-described method may be applied without modification. When some discovery resources are returned, a device, which has transmitted an expression using resources returned by the base station, selects the PDRID unused in resource group that is not returned, and then continues to perform transmission.

Second, when the number of CIDs decreases in CID broadcast in the paging stage, CIDs out of the range are allowed to give up broadcast.

For an appropriate configuration (an amount of resources, etc.), the network needs to monitor appropriateness of wireless resources associated with the distributed control D2D communication. Hereinafter, a method of monitoring appropriateness of wireless resources associated with the distributed control D2D communication will be described.

A first method is a method of collecting activation state information about capability and function of the distributed control D2D communication of devices in connected state. When a device accesses a cell, the device reports whether to have the distributed control D2D communication capability and whether to activate the capability.

In this case, the device may participate in only the discovery or all distributed control D2D communication processes. Also, the device may report whether an activation state is changed by a user.

Through this, the number of devices in connected state participating in the distributed control D2D communication (more exactly, discovery and paging/traffic) can be seen in the network.

A second method is a method of monitoring appropriateness of wireless resources for discovery, which may estimate the number of devices in a cell (including a device in idle state) participating in the discovery, and the needed amount of resources, using the D2D communication capability and activation state information of the above-described devices in connected state.

A third method is a method of monitoring appropriateness of wireless resources for paging. The method may estimate the number of devices in a cell (including a device in idle state) participating in the paging, and the needed amount of resources, using the D2D communication capability and activation state information of the above-described devices in connected state. Also, the method may estimate the appropriate amount of resources and the needed amount of resources, using data collected according to the method of monitoring appropriateness of wireless resources for traffic.

A fourth method is a method of monitoring appropriateness of wireless resources for traffic. The method may monitor the generation of charging data and the amount of D2D traffic, using information reported to the network by a device transmitting data through the distributed control D2D communication. In this case, the device may reduce overheads of signaling, such that when the device has transmitted data for an appropriate time period or over a certain amount, the device reports this.

The device may report to a network (base station) when the device continuously fails to obtain a channel use authority in link scheduling to transmit no data over a certain time period, or to have latency over a certain level. In this case, this report is made to all devices, or only devices previously selected by a base station. If it is determined to be in a state where resources for traffic is short, that is, in congestion, the device may request the central control D2D link establishment to the base station, and the network may change the configuration such that much more resources may be allocated to the distributed control D2D communication.

With the D2D communication method in the cellular communication network according to the present invention, as described above, the cellular communication, the central control D2D communication, or the distributed control D2D communication can flexibly and selectively operate in the cellular communication network.

Also, synchronization, discovery, paging, and traffic methods capable of the distributed control D2D communication in the cellular communication network may be specifically provided, thereby allowing for the distributed control D2D communication in a 3GPP LTE mobile communication network. Thus, resources can be efficiently operated.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of operating a terminal capable of supporting D2D (device to device) communication based on cellular communication network, comprising:
   extracting a cellular frame timing and SFN (system frame number) information using a broadcast channel and synchronization signal from a base station;
   receiving setting information for distributed control D2D communication from the base station;
   acquiring a timing for the distributed control D2D communication on the basis of the cellular frame timing, the system frame number, and the setting information; and
   performing the distributed control D2D communication on the basis of the timing for the distributed control D2D communication.

2. The method of claim 1, wherein the synchronization signal is PSS (primary synchronization signal) or SSS (secondary synchronization signal), and the broadcast channel is PBCH (Physical Broadcast Channel).

3. The method of claim 1, wherein the setting information is received through SI (system information) or RRC (radio resource control) signaling.

4. The method of claim 1, wherein the setting information comprises: at least one of (a) information for acquiring a start point of the distributed control D2D communication from the cellular frame timing and the system frame number; (b) information regarding time periods of discovery, paging, and traffic stages for the distributed control D2D communication; (c) information regarding a transmission method for the distributed control D2D communication; and (d) information regarding a hash function for generation of a connection ID.

5. The method of claim 1, wherein in the performing of the distributed control D2D communication, the terminal controls, in paging and traffic stages, transmission power on the basis of the density of terminals participating in the distributed control D2D communication in a cell.

6. The method of claim 1, wherein in the performing of the distributed control D2D communication, the terminal selects and uses PDR (Peer Discovery Resource) grouped by probability of being returned by the base station, in ascending order of the probability.

7. The method of claim 6, wherein the setting information comprises information regarding selection criteria and grouping information of PDR used in the discovery stage of the distributed control D2D communication.

8. The method of claim 1, further comprising reporting to the base station information regarding performance capability of the distributed control D2D communication and activation of the performance capability.

9. The method of claim 1, further comprising reporting to the base station, success of data transmission through the distributed control D2D communication.

10. The method of claim 1, further comprising reporting failure or latency generation to the base station when the terminal fails, data transmission through the distributed control D2D communication, or latency is generated over a certain level.

* * * * *